United States Patent
Natesan Ramamurthy et al.

(10) Patent No.: US 11,443,236 B2
(45) Date of Patent: Sep. 13, 2022

(54) ENHANCING FAIRNESS IN TRANSFER LEARNING FOR MACHINE LEARNING MODELS WITH MISSING PROTECTED ATTRIBUTES IN SOURCE OR TARGET DOMAINS

(71) Applicant: International Business Machines Corporation, Armonk, NY (US)

(72) Inventors: Karthikeyan Natesan Ramamurthy, Pleasantville, NY (US); Amanda Coston, Pittsburgh, PA (US); Dennis Wei, Sunnyvale, CA (US); Kush Raj Varshney, Ossining, NY (US); Skyler Speakman, Nairobi (KE); Zairah Mustahsan, White Plains, NY (US); Supriyo Chakraborty, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 376 days.

(21) Appl. No.: 16/692,974

(22) Filed: Nov. 22, 2019

(65) Prior Publication Data
US 2021/0158204 A1 May 27, 2021

(51) Int. Cl.
*G06N 20/00* (2019.01)
(52) U.S. Cl.
CPC ................... *G06N 20/00* (2019.01)

(58) Field of Classification Search
CPC ...................................................... G06N 20/00
See application file for complete search history.

(56) References Cited

U.S. PATENT DOCUMENTS

| | | | |
|---|---|---|---|
| 9,275,347 B1 | 3/2016 | Harada et al. | |
| 9,792,560 B2 | 10/2017 | Jeong et al. | |
| 10,127,477 B2 | 11/2018 | Chen et al. | |
| 10,275,690 B2 | 4/2019 | Chen et al. | |
| 2009/0150134 A1* | 6/2009 | De Leon | G16H 40/20 703/11 |
| 2017/0161635 A1 | 6/2017 | Oono et al. | |
| 2017/0330109 A1* | 11/2017 | Maughan | G06N 20/00 |
| 2021/0019636 A1* | 1/2021 | Ishii | G06N 20/00 |
| 2021/0099474 A1* | 4/2021 | Huang | G06N 3/0454 |

OTHER PUBLICATIONS

Kallus et al, "Residual Unfairness in Fair Machine Learning from Prejudiced Data", 2018, International Conference on Machine Learning, All Pages (Year: 2018).*

Juan Pavez et al, A covariate shift method using approximated density ratios, Dec. 12, 2016, Internatinal Conference on Pattern Recognition Systems, All Pages (Year: 2016).*

(Continued)

*Primary Examiner* — Roberto Borja
(74) *Attorney, Agent, or Firm* — Sherman IP LLP; Kenneth L. Sherman; Steven Laut

(57) ABSTRACT

A method of utilizing a computing device to correct source data used in machine learning includes receiving, by the computing device, first data. The computing device corrects the source data via an application of a covariate shift to the source data based upon the first data where the covariate shift re-weighs the source data.

12 Claims, 11 Drawing Sheets

(56) References Cited

OTHER PUBLICATIONS

Marek Smieja et al, Processing of missing data by neural networks, Apr. 3, 2019, Conference on Neural Information Processing Systems, All Pages (Year: 2019).*

Liu, X. et al., "Exploiting Unlabeled Data in CNNs by Self-Supervised Learning to Rank," IEEE Transactions on Pattern Analysis and Machine Intelligence, Feb. 2019, pp. 1-18, IEEE, United States.

Zhou, Z.-H., "A Brief Introduction to Weakly Supervised Learning," National Science Review, 2017, pp. 44-53.

Anonymous, "Legal Precedent Mining with Machine Learning", Dec. 15, 2017, pp. 1-37, ip.com, United States.

Anonymous, "Machine Learning for Hardware Simulation," Dec. 13, 2017, pp. 1-33, ip.com, United States.

Anonymous, "Transfer Learning with One-Class Data," Jun. 11, 2012, pp. 1-14, ip.com, United States.

Sugiyama, M. et al., "Direct importance estimation with model selection and its application to covariate shift adaptation," In Advances in neural information processing systems, 2008, pp. 1433-1440, ACM, United States.

Kamiran, F. et al., "Data preprocessing techniques for classification without discrimination," Knowledge and Information Systems, Oct. 2012, pp. 1-33, v. 33, No. 1, Springer-Verlag, Berlin, Heidelberg.

Veale, M. et al., "Fairer machine learning in the real world: Mitigating discrimination without collecting sensitive data," Big Data & Society, Oct. 30, 2017, pp. 1-17, v. 4, No. 2, Sage Journals, United States.

Gupta, M. et al., "Proxy Fairness," 2018, pp. 1-12, arXiv1806. 11212, United States.

Chen, J. et al., "Fairness Under Unawareness: Assessing Disparity When Protected Class Is Unobserved," in FAT* '19: Conference on Fairness, Accountability, and Transparency (FAT* '19), Jan. 29-31, 2019, Atlanta, GA, USA.

Zemel, R. et al., "Learning fair representations", Proceedings of the 30th international Conference on Machine Learning, 2013, pp. 325-333, United States.

Madras, D. et al., "Learning adversarially fair and transferable representations," arXiv preprint arXiv:1802.06309, Feb. 2018, pp. 1-11, United States.

Oneto, L. et al., "Taking Advantage of Multitask Learning for Fair Classification," arXiv preprint arXiv:1810.08683, 2018, pp. 1-10, United States.

Dwork, C. et al., "Decoupled classifiers for group-fair and efficient machine learning." in Conference on Fairness, Accountability and Transparency, 2018, pp. 119-133, United States.

Quadrianto, N. et al., "Recycling privileged learning and distribution matching for fairness," in Advances in Neural Information Processing Systems, 2017, pp. 1-12, California, United States.

Mell et al., "The NIST Definition of Cloud Computing," National Institute of Standards and Technology Special Publication 800-145, Sep. 2011, 7 pages, United States.

{Grace Period Disclosure}: Coston, A. et al., "Fairness in the Absence of Protected Attributes: A Transfer Learning Solution," Jan. 27-28, 2019, AEIS'19, Honolulu, HI, ACM, 2019; download: https://dl.acm.org/citation.cfm?id=3314236.

* cited by examiner

ENHANCING FAIRNESS IN TRANSFER LEARNING FOR MACHINE LEARNING MODELS WITH MISSING PROTECTED ATTRIBUTES IN SOURCE OR TARGET DOMAINS

STATEMENT REGARDING PRIOR DISCLOSURES BY THE INVENTOR OR A JOINT INVENTOR

The following disclosure is submitted under 35 U.S.C. 102(b)(1)(A): DISCLOSURE: Fairness in the Absence of Protected Attributes: A Transfer Learning Solution, Amanda Coston, Karthikeyan Natesan Ramamurthy, Dennis Wei, Kush R. Varshney, Skyler Speakman, Zairah Mustahsan, and Supriyo Chakraborty, January 27-28, 2019, AEIS'19, Honolulu, Hi., ACM, 2019.

BACKGROUND

The field of an embodiment of the present invention relates to missing protected attributes for machine learning model applications.

SUMMARY

Embodiments relate to correcting source data for protected attributes used in machine learning. One embodiment provides a method of utilizing a computing device to correct source data used in machine learning and includes receiving, by the computing device, first data. The computing device corrects the source data via an application of a covariate shift to the source data based upon the first data where the covariate shift re-weighs the source data.

These and other features, aspects and advantages of the present embodiments will become understood with reference to the following description, appended claims and accompanying figures.

DETAILED DESCRIPTION

Figure 1:
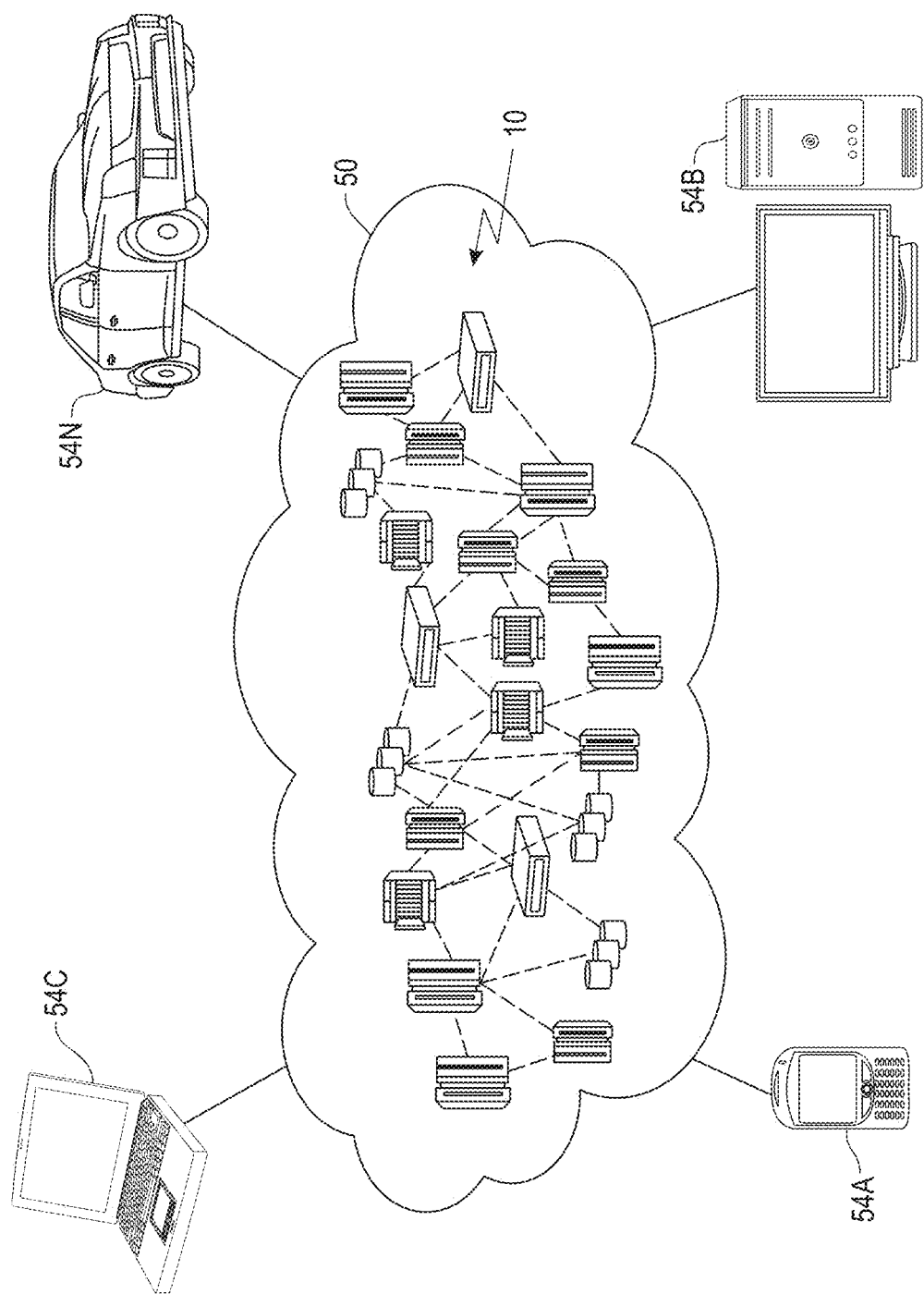
FIG. 1 depicts a cloud computing environment, according to an embodiment.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Risk assessment is a growing use for machine learning (ML) models. When used in high-stakes applications, especially ones regulated by anti-discrimination laws or governed by societal norms for fairness, it is important to ensure that learned models do not propagate and scale any biases that may exist in training data for the ML models. A protected attribute may be unavailable in many applications where regulations prevent recording the protected attribute or where the historical policy did not track the protected attribute. One or more embodiments provide a transfer learning solution to this problem that uses related datasets where there is access to the protected attribute.

One embodiment considers two scenarios in which there is limited access to the protected attribute: 1) the dataset of interest has no protected attribute but access to a related dataset with the protected attribute is accessible; 2) the training data does not have the protected attribute but unlabeled test examples that include the protected attribute is accessible. Relevant applications for the first scenario include risk assessments for hiring and credit approval decisions in which companies are prohibited from recording the protected attributes themselves but have access to publicly available aggregated datasets such as the American Community Survey (United States Census Bureau) which include protected attributes such as gender and race. One motivating application for the second scenario is healthcare expenditure prediction in which insurers use data from their existing users, which includes the expenditure amount but no protected attribute, to predict expenditure for new members whose race/ethnicity information is known but expenditure is unknown. Following the Patient Protection and Affordable Care Act in the United States, there was a rapid expansion of health insurance providers to new markets that required providers to make these assessments for thousands of new members.

In one embodiment, the transfer learning is not between privileged and unprivileged groups, but between different datasets. One or more embodiments accommodate limited access to protected attributes, whereas conventional techniques require full access to the protected attribute to identify the source and target domains. The problem setting concerns two possible scenarios in which missingness in the protected attribute is encountered: 1) the dataset of interest has no protected attribute but processing has access to a related dataset with the protected attribute; 2) training data does not have the protected attribute but processing has access to batch test examples that include the protected attribute. For both settings, one embodiment provides transfer learning solutions based on covariate shift formulations as described below.

Embodiments relate to transfer learning for fairness in the absence of protected attributes. One embodiment provides a method of utilizing a computing device to correct source data used in ML and includes receiving, by the computing device, first data. The computing device corrects the source data via an application of a covariate shift to the source data based upon the first data where the covariate shift re-weighs the source data.

It is understood in advance that although this disclosure includes a detailed description of cloud computing, implementation of the teachings recited herein are not limited to a cloud computing environment. Rather, embodiments of the present embodiments are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines (VMs), and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed and automatically, without requiring human interaction with the service's provider.

Broad network access: capabilities are available over a network and accessed through standard mechanisms that promote use by heterogeneous, thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or data center).

Rapid elasticity: capabilities can be rapidly and elastically provisioned and, in some cases, automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active consumer accounts). Resource usage can be monitored, controlled, and reported, thereby providing transparency for both the provider and consumer of the utilized service.

Service Models are as follows:

Software as a Service (SaaS): the capability provided to the consumer is the ability to use the provider's applications running on a cloud infrastructure. The applications are accessible from various client devices through a thin client interface, such as a web browser (e.g., web-based email). The consumer does not manage or control the underlying cloud infrastructure including network, servers, operating systems, storage, or even individual application capabilities, with the possible exception of limited consumer-specific application configuration settings.

Platform as a Service (PaaS): the capability provided to the consumer is the ability to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application-hosting environment configurations.

Infrastructure as a Service (IaaS): the capability provided to the consumer is the ability to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is a service oriented with a focus on statelessness, low coupling, modularity, and semantic interoperability. At the heart of cloud computing is an infrastructure comprising a network of interconnected nodes.

Referring now to FIG. 1, an illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as private, community, public, or hybrid clouds as described hereinabove, or a combination thereof. This allows the cloud computing environment 50 to offer infrastructure, platforms, and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
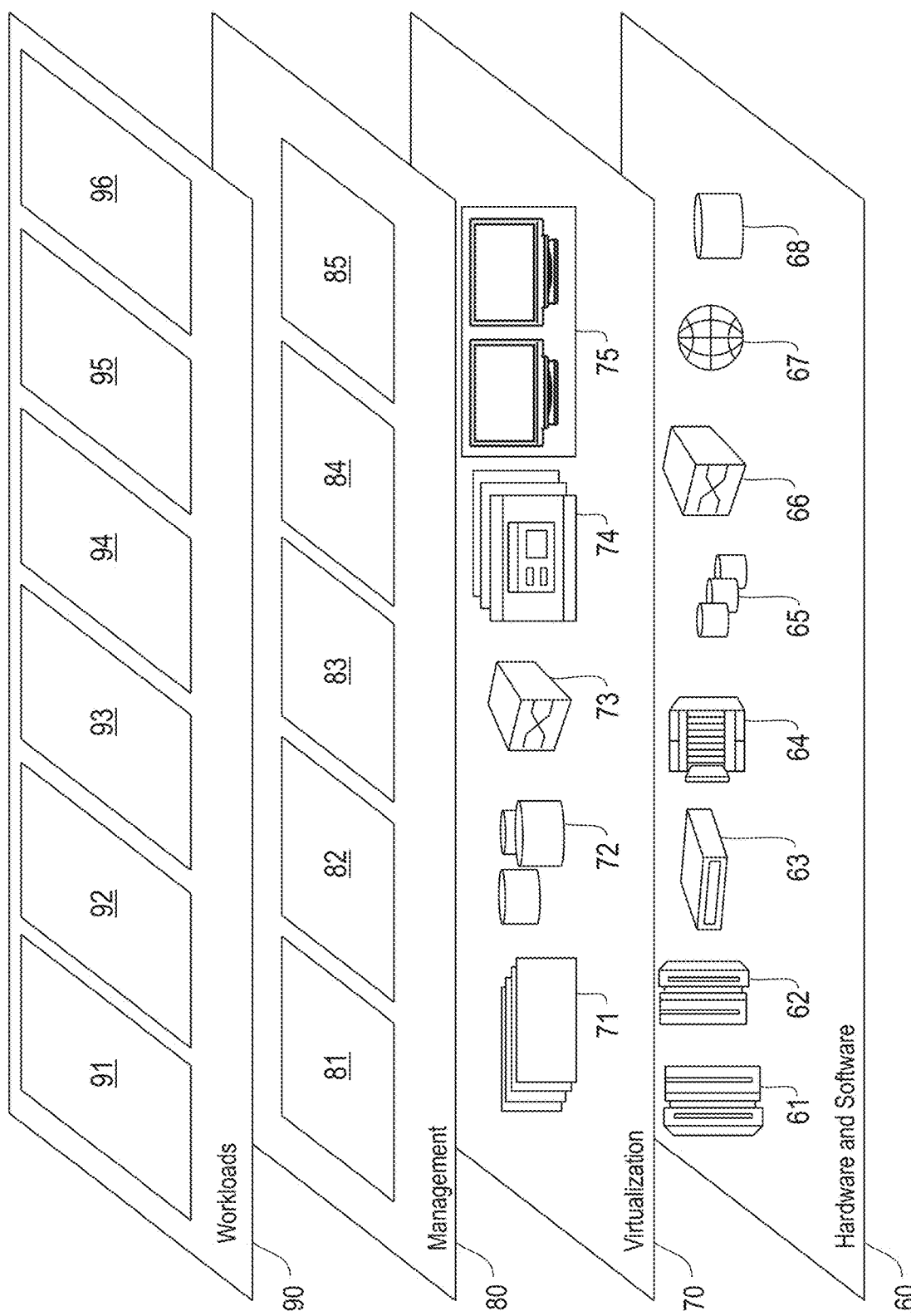
FIG. 2 depicts a set of abstraction model layers, according to an embodiment.

Referring now to FIG. 2, a set of functional abstraction layers provided by the cloud computing environment 50 (FIG. 1) is shown. It should be understood in advance that the components, layers, and functions shown in FIG. 2 are intended to be illustrative only and embodiments are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, a management layer 80 may provide the functions described below. Resource provisioning 81 provides dynamic procurement of computing resources and other resources that are utilized to perform tasks within the cloud computing environment. Metering and pricing 82 provide cost tracking as resources are utilized within the cloud computing environment and billing or invoicing for consumption of these resources. In one example, these resources may comprise application software licenses. Security provides identity verification for cloud consumers and tasks as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and transfer learning for fairness in the absence of protected attributes for ML processing 96 (see, e.g., system 500, FIG. 5, process 1100, FIG. 11). As mentioned above, all of the foregoing examples described with respect to FIG. 2 are illustrative only, and the embodiments are not limited to these examples.

It is reiterated that although this disclosure includes a detailed description on cloud computing, implementation of the teachings recited herein are not limited to a cloud computing environment. Rather, the embodiments may be implemented with any type of clustered computing environment now known or later developed.

Figure 3:
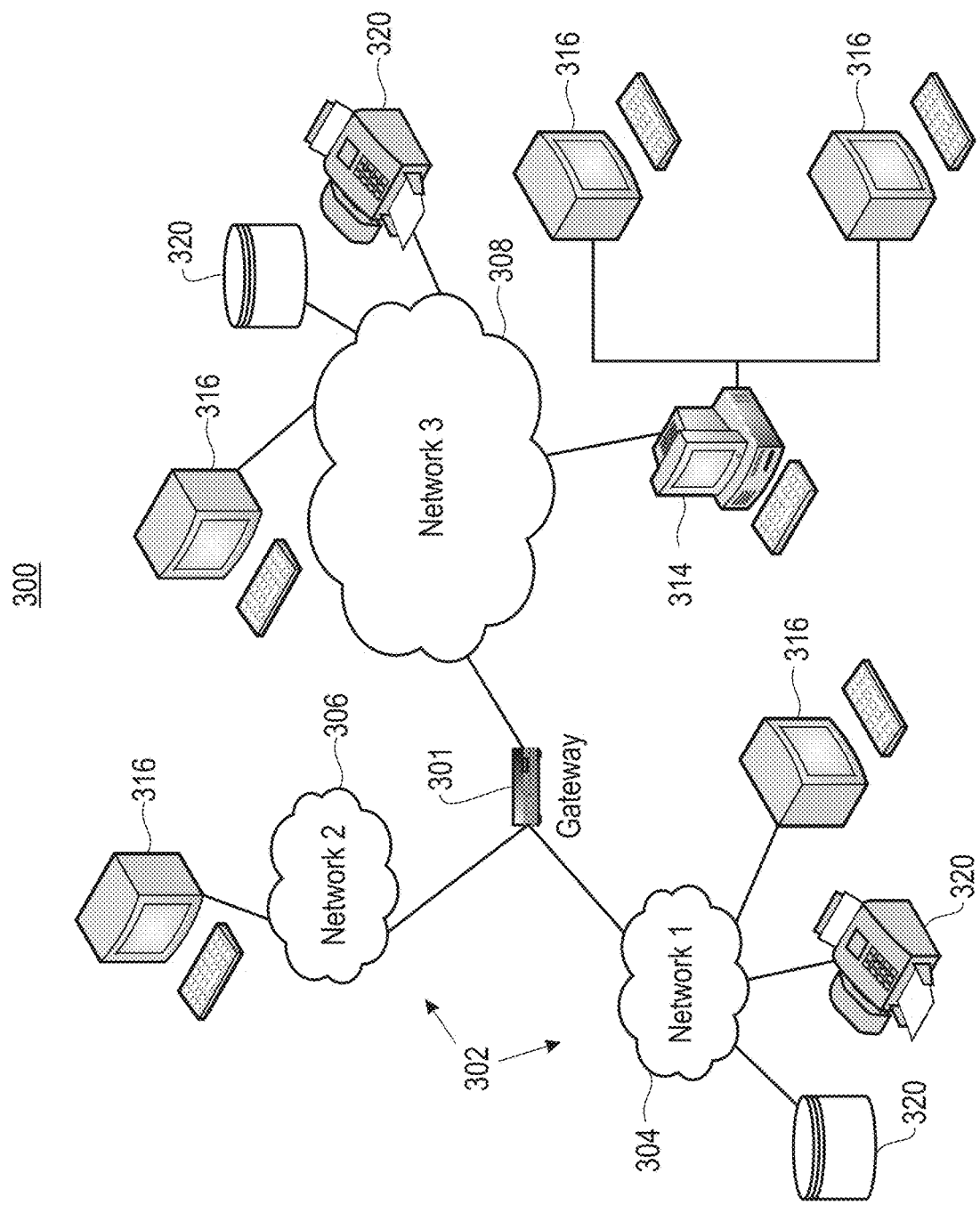
FIG. 3 is a network architecture of a system for transfer learning for fairness in the absence of protected attributes processing, according to an embodiment.

FIG. 3 is a network architecture of a system 300 for transfer learning for fairness in the absence of protected attributes processing, according to an embodiment. As shown in FIG. 3, a plurality of remote networks 302 are provided, including a first remote network 304 and a second remote network 306. A gateway 301 may be coupled between the remote networks 302 and a proximate network 308. In the context of the present network architecture 300, the networks 304, 306 may each take any form including, but not limited to, a LAN, a WAN, such as the Internet, public switched telephone network (PSTN), internal telephone network, etc.

In use, the gateway 301 serves as an entrance point from the remote networks 302 to the proximate network 308. As such, the gateway 301 may function as a router, which is capable of directing a given packet of data that arrives at the gateway 301, and a switch, which furnishes the actual path in and out of the gateway 301 for a given packet.

Further included is at least one data server 314 coupled to the proximate network 308, and which is accessible from the remote networks 302 via the gateway 301. It should be noted that the data server(s) 314 may include any type of computing device/groupware. Coupled to each data server 314 is a plurality of user devices 316. Such user devices 316 may include a desktop computer, laptop computer, handheld computer, printer, and/or any other type of logic-containing device. It should be noted that a user device 316 may also be directly coupled to any of the networks in some embodiments.

A peripheral 320 or series of peripherals 320, e.g., facsimile machines, printers, scanners, hard disk drives, networked and/or local storage units or systems, etc., may be coupled to one or more of the networks 304, 306, 308. It should be noted that databases and/or additional components may be utilized with, or integrated into, any type of network element coupled to the networks 304, 306, 308. In the context of the present description, a network element may refer to any component of a network.

According to some approaches, methods and systems described herein may be implemented with and/or on virtual systems and/or systems, which emulate one or more other systems, such as a UNIX system that emulates an IBM z/OS environment, a UNIX system that virtually hosts a MICROSOFT WINDOWS environment, a MICROSOFT WINDOWS system that emulates an IBM z/OS environment, etc. This virtualization and/or emulation may be implemented through the use of VMWARE software in some embodiments.

Figure 4:
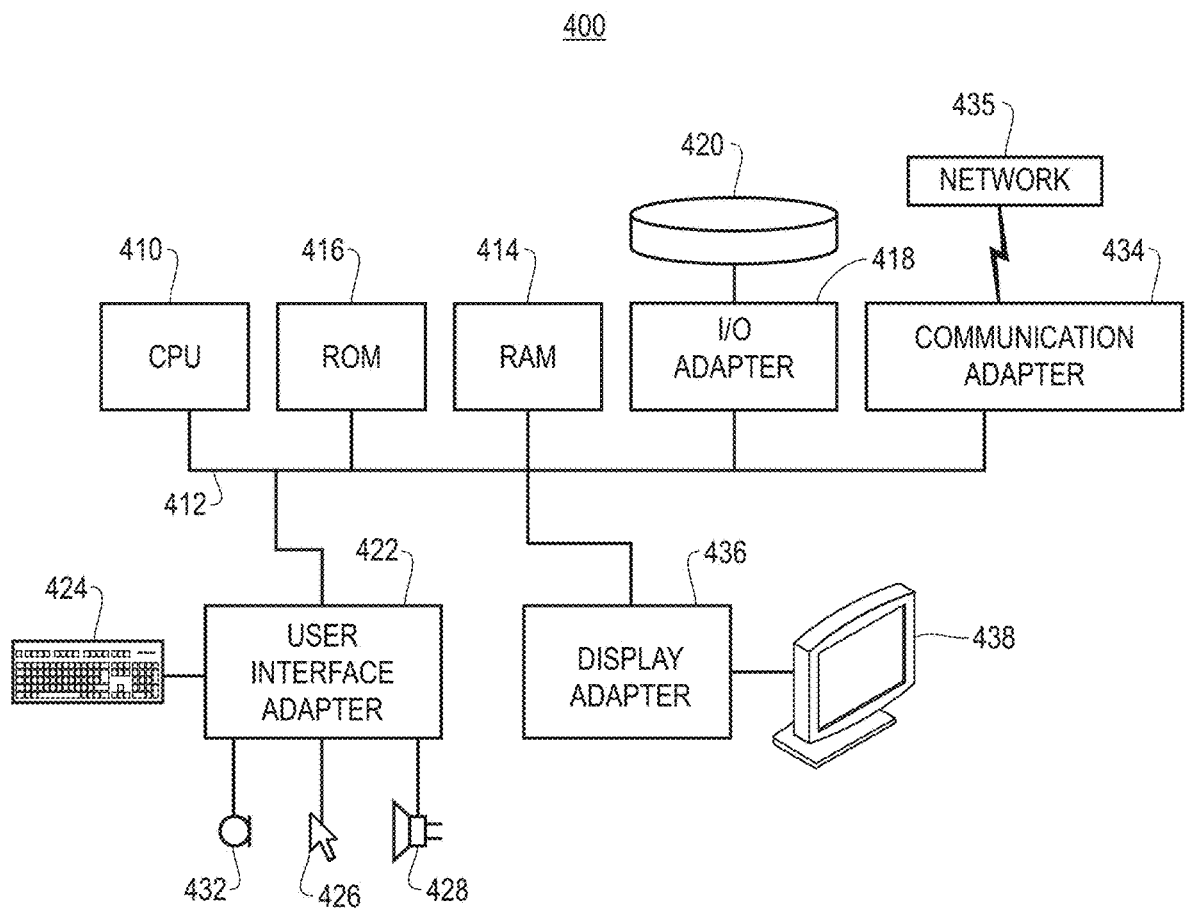
FIG. 4 shows a representative hardware environment that may be associated with the servers and/or clients of FIG. 1, according to an embodiment.

FIG. 4 shows a representative hardware system 400 environment associated with a user device 316 and/or server 314 of FIG. 3, in accordance with one embodiment. In one example, a hardware configuration includes a workstation having a central processing unit 410, such as a microprocessor, and a number of other units interconnected via a system bus 412. The workstation shown in FIG. 4 may include a Random Access Memory (RAM) 414, Read Only Memory (ROM) 416, an I/O adapter 418 for connecting peripheral devices, such as disk storage units 420 to the bus 412, a user interface adapter 422 for connecting a keyboard 424, a mouse 426, a speaker 428, a microphone 432, and/or other user interface devices, such as a touch screen, a digital camera (not shown), etc., to the bus 412, communication adapter 434 for connecting the workstation to a communication network 435 (e.g., a data processing network) and a display adapter 436 for connecting the bus 412 to a display device 438.

In one example, the workstation may have resident thereon an operating system, such as the MICROSOFT WINDOWS Operating System (OS), a MAC OS, a UNIX OS, etc. In one embodiment, the system 400 employs a POSIX® based file system. It will be appreciated that other examples may also be implemented on platforms and operating systems other than those mentioned. Such other examples may include operating systems written using JAVA, XML, C, and/or C++ language, or other programming languages, along with an object oriented programming methodology. Object oriented programming (OOP), which has become increasingly used to develop complex applications, may also be used.

Figure 5:
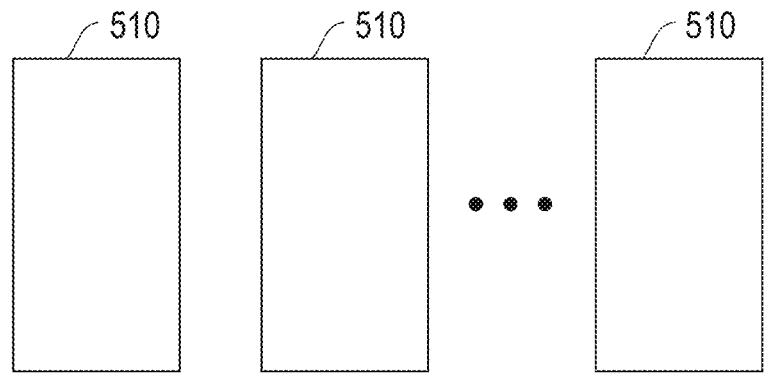
FIG. 5 is a block diagram illustrating a distributed system for transfer learning for fairness in the absence of protected attributes, according to one embodiment.
Figure 5:
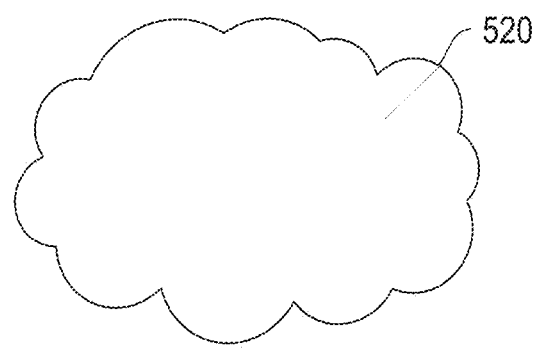
Figure 5:
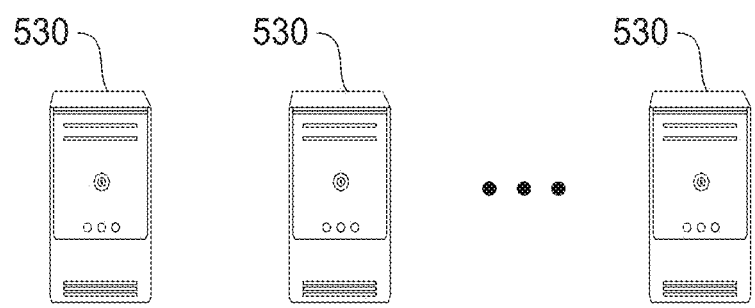

FIG. 5 is a block diagram illustrating a distributed system 500 that may be employed for transfer learning for fairness in the absence of protected attributes processing, according to one embodiment. In one embodiment, the system 500 includes client devices 510 (e.g., mobile devices, smart devices, computing systems, etc.), a cloud or resource sharing environment 520 (e.g., a public cloud computing environment, a private cloud computing environment, a data center, etc.), and servers 530. In one embodiment, the client devices 510 are provided with cloud services from the servers 530 through the cloud or resource sharing environment 520. In one embodiment, processing for learning fairness in the absence of protected attributes may involve at least two possible scenarios in which the protected attribute is missing: 1) the dataset of interest has no protected attribute, but access to a related dataset with the protected attribute is available; 2) training data does not have the protected attribute, but batch test examples that include the protected attribute are accessible. For both settings, transfer learning solutions based on covariate shift formulations are provided.

In one embodiment, labeled data $\{(x_1, y_1), \ldots, (x_n, y_n)\}$ (where x is the data and y is the label) is obtained from a source domain where $y_i \in \{0,1\}$. It is assumed that one of the labels is a more favorable outcome than the other. Unlabeled data $\{x_{n+1}, \ldots x_{n+m}\}$ is obtained from a target domain to which it is desired to assign labels. In one embodiment, $S=\{1, \ldots, n\}$ and $T=\{n+1, \ldots, n+m\}$ are used to distinguish the index sets from the source (S) and target (T) domains. With covariate shift, the features $x_i \in \mathbb{R}^d$, $i \in S$, are assumed to be drawn from a source distribution with density $p_x(x)$ while $x_i$ for $i \in T$ are drawn from a different target distribution with density $q_x(x)$. It is assumed that the conditional distribution of Y, i.e. $p_{Y|X}(y|x)$, is the same in both domains.

The standard approach to supervised learning is to find a predictor $\hat{y}(x)$ in a class $\mathcal{H}$ that minimizes empirical risk, $$\min_{\hat{y} \in \mathcal{H}} \frac{1}{n} \sum_{i \in S} \mathcal{L}(\hat{y}(x_i), y_i), \qquad \text{Eq. 1}$$

where $\mathcal{L}$ is the loss function between $\hat{y}$ and y that defines the risk. As $n \to \infty$, the empirical risk converges to the population risk, which can be written as the iterated expectation $$\mathbb{E}_{p_X}[\mathbb{E}[\mathcal{L}(\hat{y}(X),Y)|X]] \qquad \text{Eq. 2}$$

to emphasize that the outer expectation is with respect to the source distribution px. In this ideal limit where $\mathcal{H}$ also contains arbitrarily complex functions, the optimal predictor in both domains, $p_{Y|X}(\cdot|x)$, can be recovered wherever $p_x(x)$ is positive. For finite samples and constrained $\mathcal{H}$, however, the predictor obtained by minimizing empirical risk (Eq. 1) generally shows traces of $p_x$ and may not be best suited to the distribution $q_x$ under which testing occurs.

Many methods that correct the covariate shift problem do so by weighting training/source instances with weights $w_i \geq 0$ so that Eq. 1 becomes $$\min_{\hat{y} \in \mathcal{H}} \frac{1}{n} \sum_{i \in S} w_i \mathcal{L}(\hat{y}(x_i), y_i).$$

If $w_i = q_x(x_i)/p_x(x_i)$, then the weighted empirical risk converges to Eq. 2 with $p_X$ replaced by $q_X$, as is desired for the target domain. Multivariate density estimation is difficult and therefore it is common to estimate the ratio of densities directly. In one embodiment, logistic regression is used below for illustration purposes, noting that more sophisticated methods exist.

In one embodiment, the problem of fairness is considered with respect to protected groups. The definition of protected groups is assumed given and depends on the application context. Let $g_i \in \{0,1, \ldots G-1\}$ represent group identity of instance i, which may be determined by one or more protected attributes such as race, gender, etc. Particular attention is made to situations in which protected attribute data are available only in the source or target domain. In the former case, the source data consists of triplets $\{g_i, x_i, y_i\}$, $i \in S$ while the target data is $\{x_i, i \in T\}$ as before. In the latter, the source data is $\{(x_i, y_i), i \in S\}$ while the target data becomes $\{(g_i, x_i), i \in T\}$. Based on the values of $\{g_i\}$, the partition of the source data is defined into sets $S_k = \{i \in S: g_i = k\}$, i.e., source examples belonging to group k, for all $k=0, \ldots, G-1$. The partition $\{T_k, k=0, \ldots G-1\}$ of the target is defined similarly.

In one embodiment, notions of demographic or statistical parity that deal with the dependence of the classifier output on the protected attributes are the focus. A score s (x) is defined as a function that assigns to a feature vector x a number in [0,1] corresponding to the likelihood of a positive outcome Y=1 given x. s(x; θ) denotes a score function parameterized by a vector of parameters θ. Viewing X as a random variable, a distribution is induced for the score s(X) as well. Let a score satisfy score parity in the strong sense if s(X) is statistically independent of the protected group variable G. This notion may be relaxed by requiring some distributional distance $D(p_{s(X)|G}(\cdot|k), p_{s(X)|G}(\cdot|l))$ between scores conditioned on groups $k \neq l$ to be bounded by some constant $\delta > 0$.

In one embodiment, two weaker and more common definitions of score parity are focused on. The first is mean or average score parity, $$\mathbb{E}[s(X)|G=k] = \mathbb{E}[s(X)|G=l] \forall k,l \in \{0, \ldots G-1\} \qquad \text{Eq. 3}$$

which is the definition of "mean score parity." Mean score parity may also be relaxed by allowing small deviations, and it is this relaxed definition that is targeted by one or more embodiments. The second notion is thresholded score parity at threshold $t: \forall k,l \in \{0, \ldots G-1\}$, $$Pr(s(X) > t|G=k) = Pr(s(X) > t|G=l) \qquad \text{Eq.4}$$

Thresholded score parity applies when the score is thresholded to yield a binary prediction. It is used below as a second fairness metric to evaluate different embodiments. If a score satisfies thresholded parity for all thresholds $t \in [0,1]$, then it also satisfies parity in the strong sense above. Strong score parity implies both mean and thresholded parity. Moreover, if approximate strong parity holds in that $D(p_{s(X)|G}(\cdot|k) p_{s(X)|G}(\cdot|l))$ is small, then one expects the mean score parity and thresholded score disparity to be small as well although the details depend on the distance measure D.

A quantity not involving but related to scores is prevalence, which describes the proportions of class labels. For binary Y, it is sufficient to assess prevalence Pr(Y=1) of the positive outcome in the entire dataset and prevalence Pr(Y=1)|G=k) for particular groups. Prevalence differences between groups are therefore a measure of bias in the dataset. Since scores are often designed to estimate either $P_{Y|X}$ or Y itself after thresholding, controlling group-specific prevalences is a way of encouraging mean score parity in the former case or thresholded score parity in the latter, provided that the score is an approximately unbiased estimator, $\mathbb{E}[s(X)] \approx \mathbb{E}[Y]$ or $Pr(s(X)>t) \approx Pr(Y=1)$. The embodiments described below rely on this relationship between prevalences and scores.

Given the popularity of weighting methods in works on fairness and for the covariate shift problem, in one embodiment weighting methods are generated to learn from related datasets where the protected attribute is available. Weights $w_i \geq 0$ are determined for the training instances $(x_i, y_i)$, $i \in S$. In one embodiment, two processing techniques are used (prevalence-constrained covariate shift (PCCS) and target-fair covariate shift (TFCS)) for the cases in which protected attribute information is available only for the train or test examples respectively. In one embodiment, nothing more than the use of a classification process that accepts weights as input is used. In another embodiment, differentiability of the classification loss function is required. It is possible to relax this assumption, for example by using smooth approximations to the loss and second-order optimization techniques.

In one embodiment, system 500 provides transfer learning for fairness in the absence of protected attributes processing using PCCS for the scenario in which the protected attribute is available for the training set but not the test set by using covariate shift combined with weighting to bring group-specific prevalences closer together. Differences in prevalences characterize dataset bias, and controlling this bias encourages score parity. Let $w_{CS(x)}$ be a covariate shift weight, that is an approximation to the ratio $q_X(x_i)/p_X(x_i)$, obtained through logistic regression or other methods. Here, the goal is to learn weights $w_i$ for each training example that are as close as possible to the covariate shift weights subject to constraints on weighted prevalences. The objective function is thus $$\min_w \sum_{i \in S} |w_i - w_{CS}(x_i)| \quad \text{Eq. 5}$$

In one embodiment, norms other than the $\ell_1$ norm can also be used. The prevalence constraints for fairness enforce closeness between all pairs of groups:

$$\frac{\sum_{i \in S_k : y_i = 1} w_i}{\sum_{i \in S_k} w_i} \geq \frac{\sum_{i \in S_l : y_i = 1} w_i}{\sum_{i \in S_l} w_i} - \delta \quad \forall k, l \in \{0, ..., G-1\}, \quad \text{Eq. 6}$$

where the parameter $\delta$ trades off between differences in prevalences and deviation of w from $w_{CS}$. To make these constraints convex, in one embodiment equality constraints on the proportion of weight allocated are added to each group:

$$\sum_{i \in S_k} w_i = c_k \sum_{i \in S} w_i, k \in \{0, ..., G-1\} \quad \text{Eq. 7}$$

where $$c_k = \frac{\sum_{i \in S_k} w_{CS}(x_i)}{\sum_{i \in S} w_{CS}(x_i)}, \quad \text{Eq. 8}$$

that is, the allocations to groups specified by the covariate shift weights are required to remain unchanged. Lastly weights are required to be non-negative:

$$w_i \geq 0, i \in S \quad \text{Eq. 9}$$

The optimization problem is to minimize the objective in Eq. 5 subject to constraints Eqs. 6-9.

In one embodiment, system 500 provides transfer learning for fairness in the absence of protected attributes processing by addressing the scenario in which the protected attribute is available for the batch test set but not the training set. The score disparity of the classifier on the test data may be directly evaluated and the classifier is adjusted to reduce the disparity. The classifier parameters are assumed chosen to minimize the weighted empirical risk, $$\hat{\theta} = \arg\min_\theta \frac{1}{n} \sum_{i \in S} w_i \mathcal{L}(s(x_i; \theta), y_i), \quad \text{Eq. 10}$$

where $\mathcal{L}(s(x;\theta),y)$ is twice differentiable function $\theta$ as discussed and any regularizer is absorbed into $\mathcal{L}$. Thus the classifier can be adjusted by changing the weights $w_i$.

In one embodiment, to measure score disparity, the following fairness loss that sums the squares of average score disparities over all pairs of groups $(T_k, T_l)$ is introduced:

$$\mathcal{L}_f(s(\cdot; \hat{\theta})) = \sum_{k<l} \left( \frac{1}{|T_k|} \sum_{i \in T_k} s(x_i; \hat{\theta}) - \frac{1}{|T_l|} \sum_{i \in T_l} s(x_i; \hat{\theta}) \right)^2. \quad \text{Eq. 11}$$

The weights $w_i$ are chosen to minimize a linear combination of this fairness loss with classification loss:

$$\min_\omega \frac{1}{n} \sum_{i \in S} w_{CS}(x_i) \mathcal{L}(s(x_i; \hat{\theta}), y_i) + \lambda \mathcal{L}_f(s(\cdot; \hat{\theta})), \quad \text{Eq. 12}$$

where $w_{CS}(x_i)$ are covariate shift weights as described above and are fixed (not to be confused with w). The first term in Eq. 12 approximates classification loss on the target population by weighting the source population, where labels are available. The fairness loss $\mathcal{L}_f$ is evaluated on the target, where the protected attribute is available. Both terms are explicit functions of the scores parameterized by $\hat{\theta}$; the notation $s(\cdot;\hat{\theta})$ emphasizes this dependence. The parameters $\hat{\theta}$ are a function of the optimization variables $w_i$ through Eq. 10.

Since the combined loss (Eq. 12) is an indirect function of w via Eq. 10, the calculation of its gradient with respect to w is non-standard. The following derivation is similar to and takes inspiration from the theory of influence functions, which describe the effect of individual training points on model parameters. Here the effect of reweighting all training points at once is considered. First define $\mathcal{L}_c$ to be the re-weighted classification loss in Eq. 12, $$\mathcal{L}_c(\theta) = \frac{1}{n}\sum_{i \in S} w_{CS}(x_i)\mathcal{L}(s(x_i;\theta), y_i).$$

The derivative of $\mathcal{L}_c$ with respect to each $w_i$ is given by the chain rule as $$\frac{\partial \mathcal{L}_c}{\partial w_i} = (\nabla_{\hat\theta}\mathcal{L}_c)^T \frac{\partial \hat\theta}{\partial w_i}, \quad \text{Eq. 13}$$

and similarly for $\mathcal{L}_f$. The second factor in Eq. 13 is the vector of partial derivatives $$\frac{\partial \hat\theta_j}{\partial w_i}$$

for all j. Hence for the combined loss $\mathcal{L}_t = \mathcal{L}_c + \lambda \mathcal{L}_f$, $$\frac{\partial \mathcal{L}_t}{\partial w_i} = (\nabla_{\hat\theta}\mathcal{L}_c + \lambda \nabla_{\hat\theta}\mathcal{L}_f)^T \frac{\partial \hat\theta}{\partial w_i}. \quad \text{Eq. 14}$$

To derive an expression for $$\frac{\partial \hat\theta_j}{\partial w_i},$$

it is noted that if $\hat\theta$ is a minimizer in Eq. 10, then it must satisfy the first-order optimality conditions of $$\sum_{i \in s} w_i \frac{\partial \mathcal{L}(s(x_i;\theta), y_i)}{\partial \hat\theta_j} = 0 \forall j.$$

For fixed $\{(x_i,y_i), i \in S\}$, these conditions give a set of implicit equations for $\hat\theta$ in terms of $\{w_i\}$. An explicit expression may be obtained for the derivative $$\frac{\partial \hat\theta}{\partial w_i}$$

using the method of eliminating differentials as follows:

$$dw_i \frac{\partial \mathcal{L}(s(x_i;\theta), y_i)}{\partial \hat\theta_j} + \sum_{i' \in S} w_{i'} \sum_k \frac{\partial^2 \mathcal{L}(s(x_{i'};\theta), y_{i'})}{\partial \hat\theta_j \partial \hat\theta_k} d\hat\theta_k = 0.$$

Rewriting in matrix-vector notation, $$\nabla_{\hat\theta}\mathcal{L}(s(x_i;\theta), y_i) + H_{\hat\theta} \frac{\partial \hat\theta}{\partial w_i} = 0,$$

where $H_{\hat\theta}$ is defined as $$H_{\hat\theta} = \sum_{i \in s} w_i \nabla_{\hat\theta}^2 \mathcal{L}(s((x_i;\theta), y_i). \quad \text{Eq. 15}$$

Hence $$\frac{\partial \hat\theta}{\partial w_i} = -H_{\hat\theta}^{-1} \nabla_{\hat\theta}\mathcal{L}(s(x_i;\theta), y_i). \quad \text{Eq. 16}$$

For the case of binary classification with log loss $\mathcal{L}$ (also known as cross-entropy) and logistic regression results in $$\mathcal{L}(s, y) = -y\log(s) - (1-y)\log(1-s),$$
$$s(x;\theta) = \sigma(\theta^T x) = \frac{1}{1+e^{-\theta^T x}},$$

where $\sigma(t)$ denotes the sigmoid function $$\frac{1}{1+e^{-t}}.$$

Then $$\nabla_{\hat\theta} s = \frac{e^{-\hat\theta^T x}}{(1+e^{-\hat\theta^T x})^2} \cdot x = s(1-s)x, \quad \text{Eq. 17}$$

$$\nabla_{\hat\theta}\mathcal{L} = (-y(1-s) + (1-y)s)x. \quad \text{Eq. 18}$$

In one embodiment, using Eq. 18 and letting $s_i = s(x_i;\hat\theta)$, the gradient of the classification loss is therefore $$\nabla_{\hat\theta}\mathcal{L}_c = \frac{1}{n}\sum_{i \in s} w_{CS}(x_i)[-y_i(1-s_i) + (1-y_i)s_i]x_i. \quad \text{Eq. 19}$$

Likewise using Eq. 17, the gradient of the fairness loss is $$\nabla_\theta \mathcal{L}_F = 2\sum_{k<l}\left[\left(\frac{1}{|T_k|}\sum_{i \in T_k} s_i - \frac{1}{|T_l|}\sum_{i \in T_l} s_i\right) \times \left(\frac{1}{|T_k|}\sum_{i \in T_k} s_i(1-s_i)x_i - \frac{1}{|T_l|}\sum_{i \in T_l} s_i(1-s_i)x_i\right)\right]. \quad \text{Eq. 20}$$

For the Hessian the following is found
$$\nabla_\theta^2 \mathcal{L} = x(\nabla_{\hat\theta} s)^T = s(1-s)xx^T, \quad \text{Eq. 21}$$

which is needed in Eq. 15.

In one embodiment, system 500 provides transfer learning for fairness in the absence of protected attributes processing using the TFCS process shown below in algorithmic format (Processing 1) as follows:

Processing 1.
Input:
    Data: labeled source $\{(x_i, y_i), i \in S\}$, target with protected attribute $\{(x_i, g_i), i \in T\}$
    Parameters: trade-off $\lambda$, step size $\eta$
    Estimate covariate shift weights $w_{cs}$ from $\{x_i, i \in S \cup T\}$
    $w \leftarrow w_{cs}$ or $w_i \leftarrow 1\ \forall i$ (uniform)
    repeat
        Learn classifier parameters $\hat{\theta}$ given w using Eq. 10
        Evaluate combined loss using Eq. 12
        # Gradient computations:
        Compute $\nabla_{\hat{\theta}} \mathcal{L}_c$ using Eq. 19
        Compute $\nabla_{\hat{\theta}} \mathcal{L}_c$ using Eq. 20
        Compute $\dfrac{\partial \hat{\theta}}{\partial w_i} \forall i$ using Eq. 16
        Compute $\nabla_w \mathcal{L}_t$ using Eq. 14
        # Gradient update
        $w \leftarrow w - \eta \nabla_w \mathcal{L}_t$
    Until stopping criteria is met
Output: Classifier parameters $\hat{\theta}$, weights w.

In one embodiment, for system 500 transfer learning for fairness in the absence of protected attributes processing, Eq. 12 is optimized through gradient descent. Processing 1 alternates between gradient updates to w to decrease the objective in Eq. 12 and solving Eq. 10 to obtain a new classifier from the updated w, which is then re-evaluated using Eq. 12. For testing presentations, a constant step size $\eta$ is used and the process is terminated after a fixed number of iterations.

The combined loss (Eq. 12) is generally not a convex function of the weights $w_i$. Hence different initializations may lead to different solutions. In one embodiment, one choice is to initialize with covariate shift weights, $w=w_{CS}$. In the case of $\lambda=0$ in Eq. 12 (i.e., only classification loss), $w=w_{CS}$ is a stationary point. Since $\hat{\theta}$ is a minimizer in Eq. 10, it satisfies $$\frac{1}{n}\sum_{i \in s} w_i \nabla_\theta \mathcal{L}(s(x_i; \hat{\theta}), y_i) = 0.$$

The left-hand side coincides with $\nabla_{\hat{\theta}} \mathcal{L}_c$ when $w=w_{CS}$ and therefore $\nabla_{\hat{\theta}} \mathcal{L}_c=0$. Combining this with $\lambda=0$ in Eq. 14 implies that $\nabla_w \mathcal{L}_t=0$ at $w=w_{CS}$. Accordingly, for small $\lambda$, $w=w_{CS}$ is expected to be near-stationary. In one embodiment, a simpler alternative is to initialize with uniform weights $w_i=1$.

In one embodiment, for system 500 transfer learning for fairness in the absence of protected attributes processing, the utility of PCCS and TFCS for three example applications are presented below. The first example application is a healthcare cost prediction scenario when a health insurance company that is servicing an existing market desires to venture into a new market, while ensuring equal benefit to all race- and gender-based intersectional groups in the new market. The second example application is a loan approval setting where a mobile money provider uses data that contains the protected attribute from one country in East Africa to train a model for another country. The third example application uses the UCI® Adult dataset (based on the 1994 census income database) as a benchmark where the dataset is partitioned into the set of private sector workers versus other workers to simulate a setting where a protected attribute such as gender may be available, for example, for public workers but not for private workers. For evaluation purposes, full access is available to the protected attribute and labeled outcome in all datasets. Both PCCS and TFCS processing are performed for comparison in the examples that follow. AUC is used to assess accuracy and the following four fairness metrics are determined/computed:

1. Mean score parity (MSP) loss: square root of sum of squares of differences between mean scores for all pairs of groups (see Eqs. 3 and 11).
2. Thresholded score parity (TSP) loss: square root of sum of squares of differences between thresholded scores for all pairs of groups (see Eq. 4).
3. Max $\Delta$ MSP: maximum of absolute differences between mean scores for all pairs of groups.
4. Max $\Delta$ TSP: maximum of absolute differences between thresholded scores for all pairs of groups.

In one embodiment, for system 500 transfer learning for fairness in the absence of protected attributes processing for the following example applications, the utility of PCCS and TFCS processing are compared against four baselines as follows:
1. Native: train and test on the target population (i.e., not in the transfer learning setting).
2. Un-adapted transfer learning: train on the source population and test on target population without any adaptation to the target population during training.
3. Covariate shift: train on the source population reweighed to resemble the target population.
4. Kamiran-Calders (Kamiran, F., and Calders, T. 2012. Data preprocessing techniques for classification without discrimination. Knowledge and Information Systems 33(1):1-33): correct the source dataset for fairness using the Kamiran-Calders approach without performing any covariate shift.

For the example applications using system 500 transfer learning for fairness in the absence of protected attributes processing, testing is performed on the target population where true labels and protected attributes are used to evaluate accuracy and fairness. PCCS and Kamiran-Calders use protected attributes only from the source while TFCS uses the protected attributes only from the target. In all cases, logistic regression is used as the classification algorithm and also to obtain covariate shift weights. This choice is intended as a simple illustration of the processing methods for one embodiment. TFCS processing is initialized using uniform weights and its stopping criterion is a maximum number of iterations, usually set to a few hundred, depending on the dataset used. The choice of the free parameters for PCCS and TFCS processing ($\delta$ and $\lambda$) depends on the particular setting (including the initial discrepancies in group prevalences) but generally using a $\delta$ in [0, 0.075] for PCCS is recommended. For TFCS, using cross-validation is recommended to choose $\lambda$.

Figure 6:
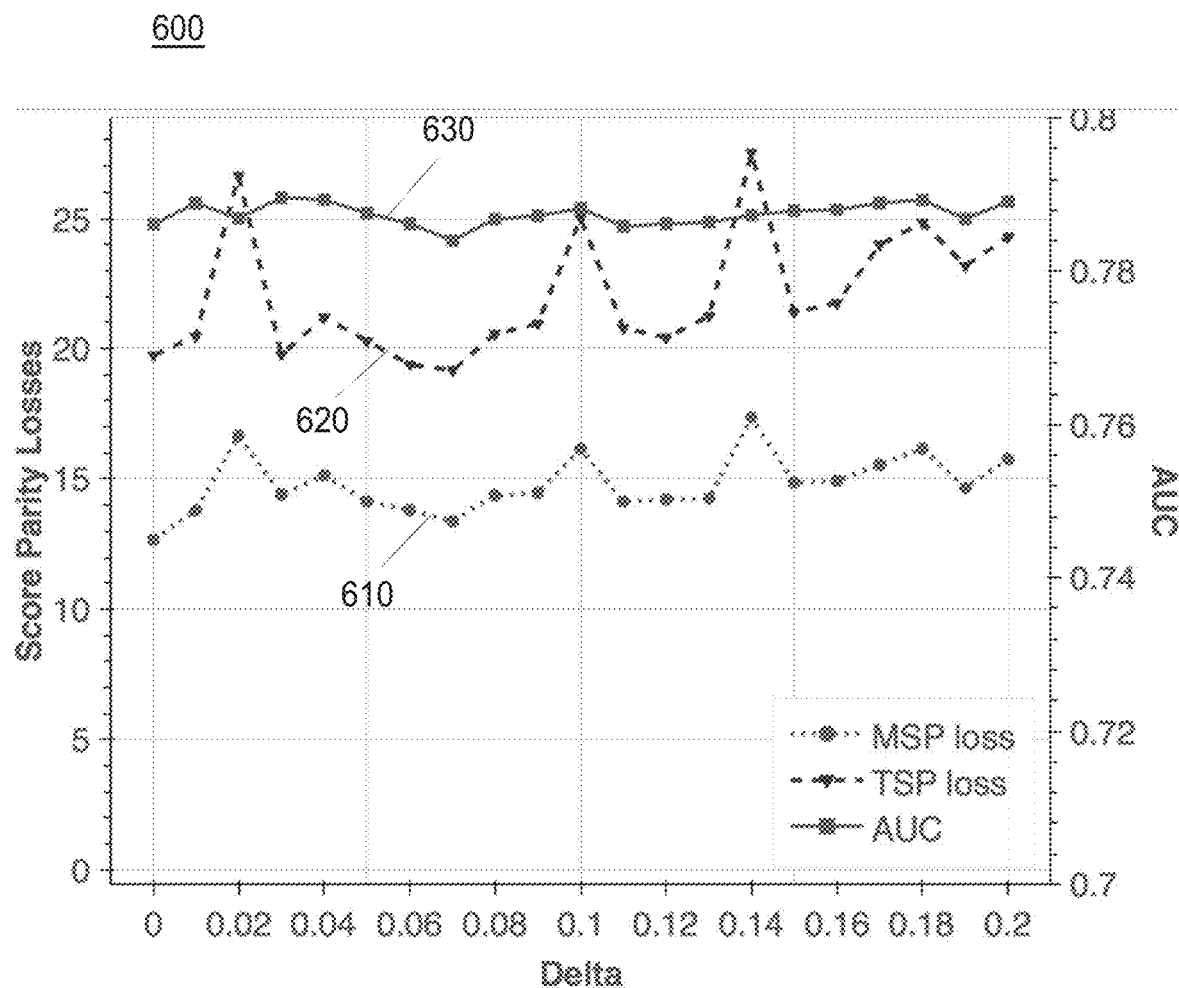
FIG. 6 illustrates a graph of variation of score parities and area under curve (AUC) with prevalence constrained covariate shift (PCCS) trade-off parameter $\delta$ for the medical expenditure panel survey (MEPS) dataset, according to an embodiment.

FIG. 6 illustrates a graph 600 of variation of score parities and AUC 630 with PCCS trade-off parameter $\delta$ for the medical expenditure panel survey (MEPS) dataset, according to an embodiment. The MEPS dataset (Agency for Healthcare Research and Quality) is obtained using a nationally representative survey of the United States population. The MEPS dataset contains annual healthcare cost, demographics, and self-reported medical information. The data from panel 19 of the 2015 survey is used for the example application. There is no concept of market in this dataset since it does not come from an insurance provider (those datasets are proprietary, but MEPS shares relevant characteristics with such datasets). The source market is defined to consist of people earning less than an example national median income (USD 21,000), and the target market is defined to consist of the rest of the population.

In one embodiment, two protected attributes are considered: gender and race for system 500 (FIG. 5) transfer learning for fairness in the absence of protected attributes processing in this example application. Both are legally protected. In the example application, the races considered are denoted as non-Hispanic whites and non-Hispanic blacks. The outcome variable is the binarized annual healthcare expenditure (low cost and high cost), obtained by thresholding the expenditure at its example national median (USD 1,272). Representative features considered for the classification problem include age, marital status, education, military status, self-reported health conditions, self-reported physical and cognitive limitations, employment status, poverty category, and insurance coverage status. The threshold t used for obtaining the TSP metric is 0.5 since the prevalence of outcomes in this data is equally balanced at 0.5. Table 1 shows MEPS outcome disparities in prevalence of high cost outcomes among various gender-race intersections between various groups in source (low-income) and target (high-income) populations. The disparity is given by $Pr(Y=1|G=k)-Pr(Y=1|G=l)$ with probabilities expressed as percentages. In the example application, the largest disparity shown is between black males and white females, whereas the smallest disparity shown is between white males and black females.

TABLE 1

| Groups k and l | Source | Target |
| --- | --- | --- |
| white males, black males | 14.6 | 17.4 |
| white males, white females | −12.8 | −18.0 |
| white males, black females | 3.0 | −3.4 |
| black males, white females | −27.4 | −35.4 |
| black males, black females | −11.6 | −20.9 |
| white females, black females | 15.8 | 14.5 |

In one embodiment, PCCS and TFCS are compared with the baseline approaches in Table 2 (results on the MEPS dataset where the source is low-income population, the target is high-income population; disparity measures are shown as percentages and all metrics are reported for the target). The AUC on the target population for all methods are similar except for TFCS with $\lambda=100$, as described below. The methods do show differences in score disparity in the target. Covariate shift without any fairness adjustments happens to significantly reduce the fairness losses, and Kamiran-Calders yields a similar reduction. The methods are further reduced with PCCS, which combines elements of covariate shift and parity-inducing reweighting. TFCS with $\lambda=100$ achieves by far the lowest score parity losses, at the cost of a lower AUC in the example application. The large setting for $\lambda$ is intended to show the parity levels that can be achieved.

Figure 7:
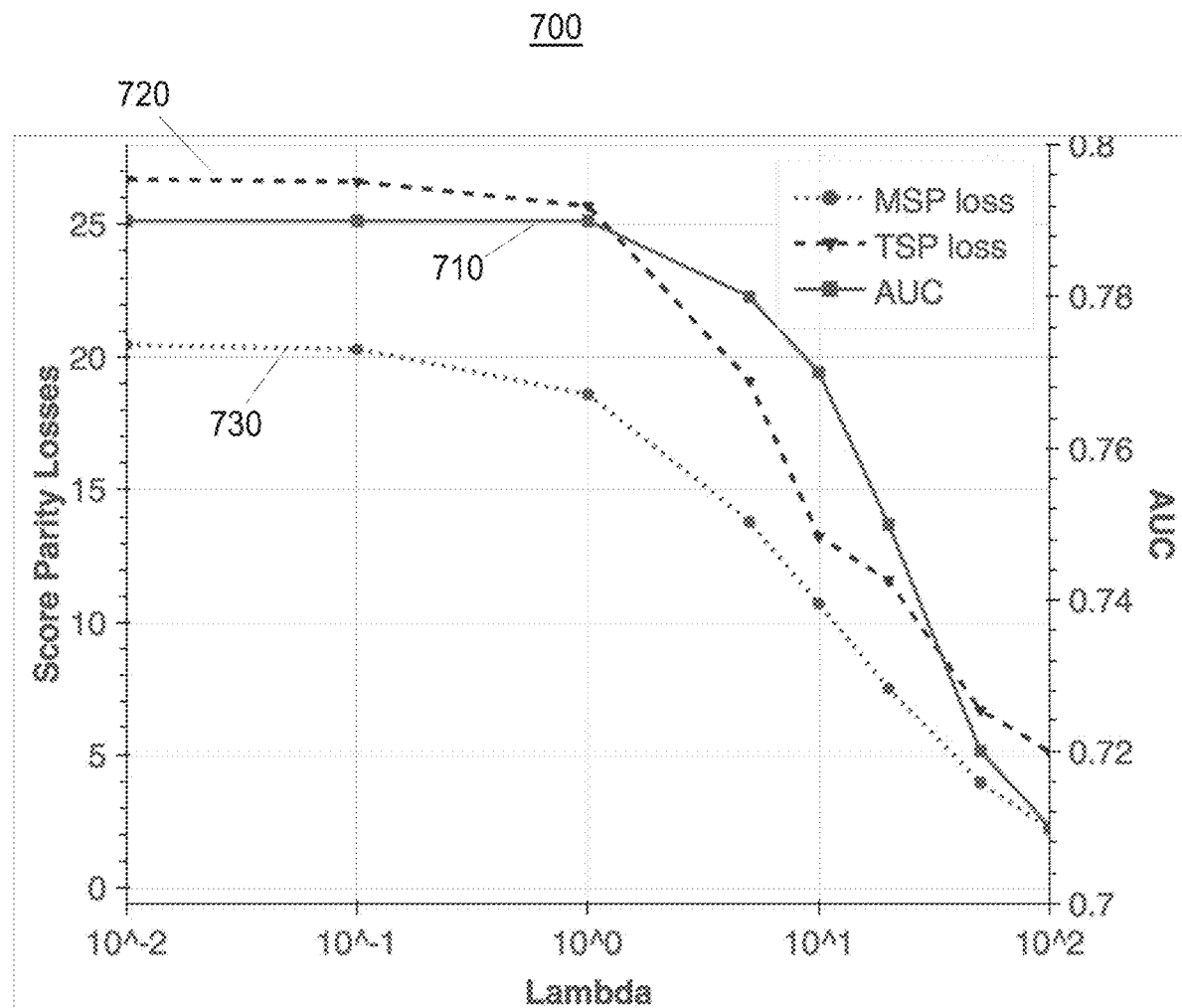
FIG. 7 illustrates a graph for variation of score parities and AUC with the target-fair covariate shift (TFCS) trade-off parameter A for the MEPS dataset, according to one embodiment.

In one embodiment, graph 600 shows the variation of fairness and accuracy metrics with respect to $\delta$ for PCCS. While the MSP loss curve 610 and the TSP loss curve 620 are each somewhat variable, there is a slight downward trend in disparities as $\delta$ decreases toward zero and tightens the prevalence constraints (Eq. 6). The AUC curve 630 is nearly constant. The behavior of TFCS with changing $\lambda$ is illustrated in FIG. 7. Recall that $\lambda$ weights the fairness component of the combined loss (Eq. 12). When $\lambda$ is small, all metrics are closer to the values obtained with methods that do not account for fairness (un-adapted, covariate shift), as expected. As $\lambda$ increases past 1, the score parity losses decrease dramatically while the AUC undergoes a more modest reduction.

Although a boost in AUC from covariate shift methods is not observed, the fairness methods that adjust for covariate shift improve the fairness metrics over Kamiran-Calders, which does not account for covariate shift.

TABLE 2

| | AUC | MSP Loss | TSP Loss | Max Δ MSP | Max Δ TSP |
| --- | --- | --- | --- | --- | --- |
| Native | 0.800 | 29.0 | 42.4 | 19.4 | 27.7 |
| Un-adapted | 0.799 | 27.0 | 43.3 | 18.9 | 30.2 |
| Covariate Shift | 0.786 | 17.6 | 30.0 | 12.3 | 21.1 |
| Kamiran-Calders | 0.799 | 16.5 | 26.2 | 11.5 | 18.5 |
| PCCS ($\delta$ = 0.05) | 0.788 | 14.2 | 20.3 | 9.7 | 14.3 |
| TFCS ($\lambda$ = 100) | 0.708 | 2.2 | 5.1 | 1.4 | 3.4 |

FIG. 7 illustrates a graph 700 for variation of score parities and AUC with the TFCS trade-off parameter $\lambda$ for the MEPS dataset, according to one embodiment. Graph 700 includes the AUC curve 710, the TSP loss curve 720 and the MSP loss curve 730.

In one embodiment, system 500 (FIG. 5) transfer learning for fairness in the absence of protected attributes processing for this example application involves mobile-money loan approvals in East Africa that are considered in a setting in which one country allows recording of the protected attributes, age and gender, whereas another country does not. Data from the one country is used to train a model that is deployed in the other country. Age (thresholded at 35 years) and gender are protected attributes. The prediction task is to identify who will likely repay a loan; the features include airtime usage and mobile money volumes sent and received over a 6-month period. The threshold for approving a loan is $t=0.75$ since banks will only issue a loan if they are confident a user will repay. Table 3 shows mobile money outcome disparities between various groups in source (original market) and target (new market) populations. The disparity is given by $Pr(Y=1)|G=k)-Pr(Y=1)|G=l)$ with probabilities expressed as percentages.

TABLE 3

| Groups k and l | Source | Target |
| --- | --- | --- |
| female 35+, female under 35 | 7.0 | 6.2 |
| female 35+, male 35+ | 3.5 | 1.4 |
| female 35+, male under 35 | 11.1 | 9.2 |
| female under 35, male 35+ | −3.6 | −4.8 |
| female under 35, male under 35 | 4.1 | 3.0 |
| male 35+, male under 35 | 7.7 | 7.9 |

Table 4 illustrates that transfer learning processing significantly improves score parity in the target population, with covariate shift and even in the un-adapted case. It is noted that this is not because the source has less dataset bias; in fact, in Table 3, it can be seen that the source dataset has larger disparities in loan approvals over the four demographic groups. In one embodiment example, PCCS and TFCS processing further reduce the four fairness metrics with little to no change in AUC for the target population. PCCS and TFCS processing outperform Kamiran-Calders, which only yields results on par with covariate shift. For this example application, it can be found that increasing $\lambda$ did not improve the score disparities for TFCS. Table 4 shows results for $\lambda=0.01$ which maintains the AUC.

TABLE 4

|  | AUC | MSP Loss | TSP Loss | Max Δ MSP | Max Δ TSP |
|---|---|---|---|---|---|
| Native | 0.658 | 7.6 | 23.0 | 4.9 | 14.5 |
| Un-adapted | 0.642 | 4.2 | 12.6 | 2.5 | 8.1 |
| Covariate Shift | 0.639 | 3.8 | 11.1 | 2.7 | 7.2 |
| Kamiran-Calders | 0.640 | 4.0 | 12.5 | 2.5 | 7.7 |
| PCCS (δ = 0.05) | 0.630 | 2.4 | 5.7 | 1.5 | 3.3 |
| TFCS (λ = 0.01) | 0.639 | 2.6 | 6.8 | 1.8 | 4.4 |

Figure 8:
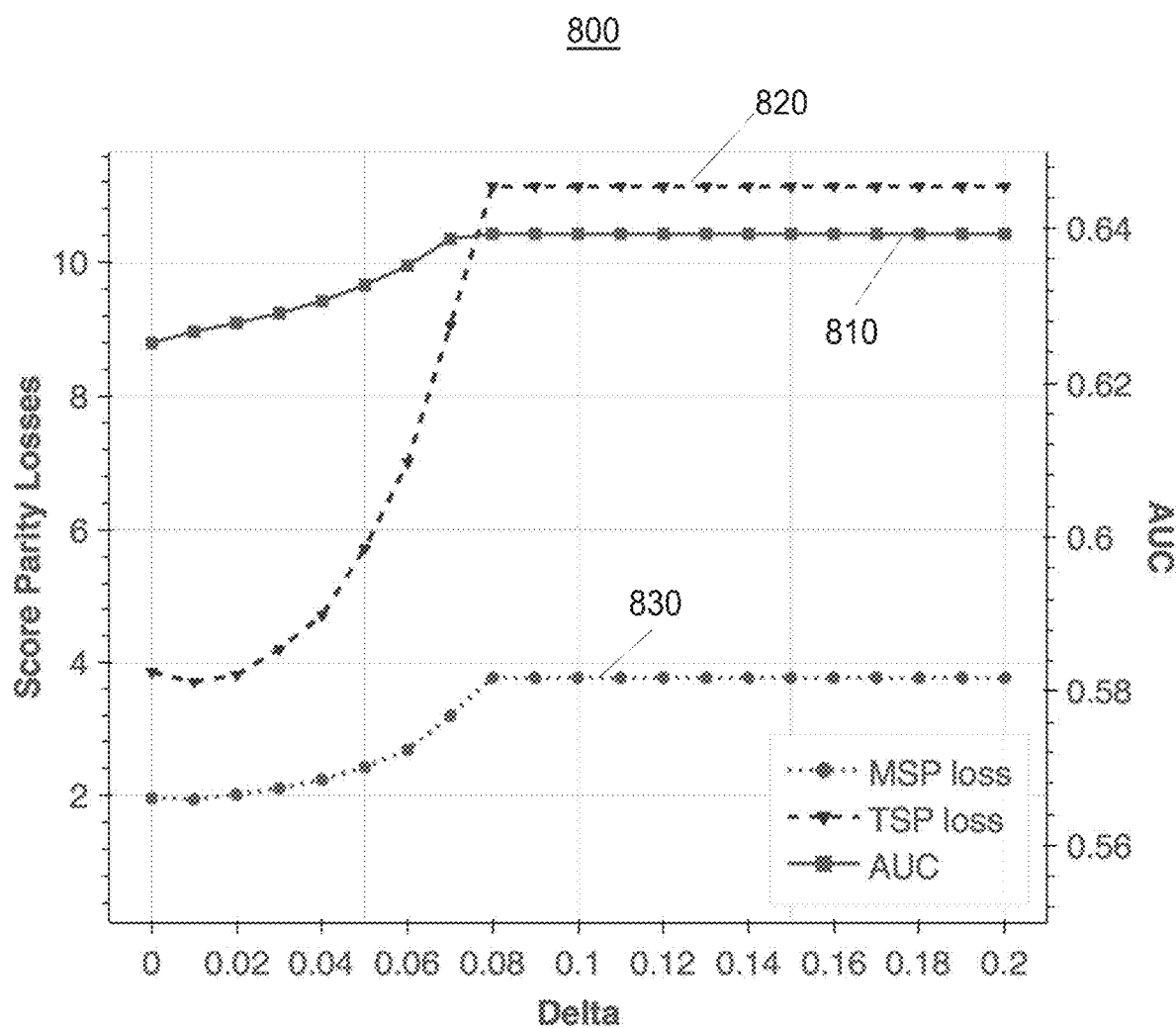
FIG. 8 illustrates a graph for variation of score parities and AUC with the PCCS trade-off parameter $\delta$ for the mobile money dataset, according to one embodiment.

FIG. 8 illustrates a graph 800 for variation of score parities and AUC with the PCCS trade-off parameter δ for the mobile money dataset, according to one embodiment. Graph 800 includes the AUC curve 810, the TSP loss curve 820 and the MSP loss curve 830. Graph 800 shows the results for system 500 (FIG. 5) transfer learning for fairness in the absence of protected attributes processing using PCCS as δ is varied to trade-off improving AUC against reducing the fairness losses. F or δ=0.08, the weighted prevalence constraints (Eq. 6) are loose enough to allow the covariate shift solution w=$w_{CS}$ and the metrics converge accordingly. The trade-off between AUC and score parity is seen for smaller δ.

Figure 9:
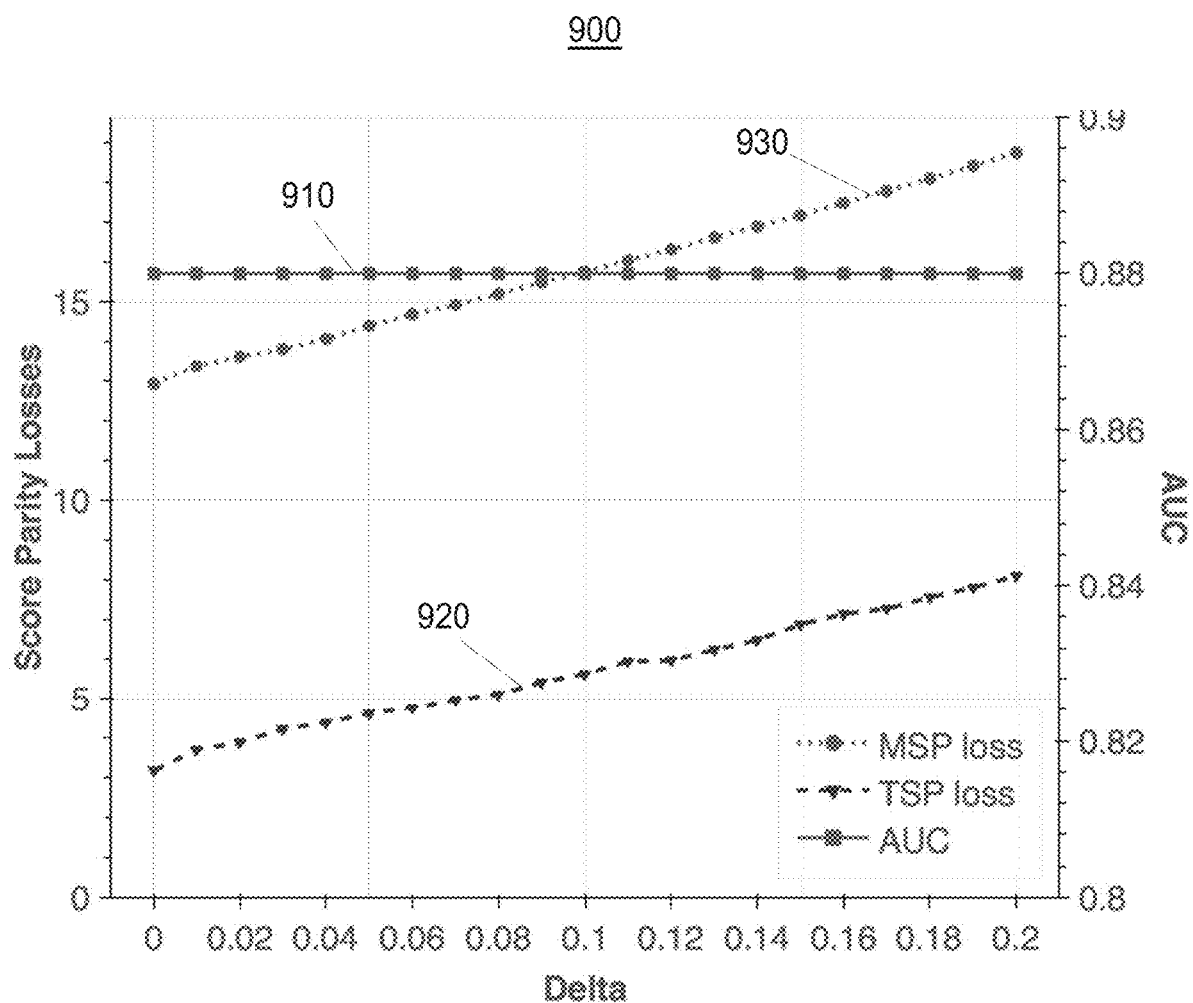
FIG. 9 illustrates a graph for variation of score parities and AUC with the PCCS trade-off parameter $\delta$ for the University of California Irvine Machine Learning Repository Adult Data Set (UCI® Adult dataset), according to one embodiment.

FIG. 9 illustrates a graph 900 for variation of score parities and AUC with the PCCS trade-off parameter δ for the UCI® Adult dataset, according to one embodiment. In one embodiment, system 500 (FIG. 5) transfer learning for fairness in the absence of protected attributes processing is used for evaluating an example application using the UCI® Adult dataset, which has been used as a benchmark in multiple studies on algorithmic fairness. The outcome variable is binarized annual income where a value over USD 50,000 is defined in this example application to be high (Y=1) and is otherwise defined as low (Y=0). The 'workclass' (worker class) variable is used to divide the dataset into source and target populations. The source is composed of private-sector workers ('workclass'='private') while the target is the remainder ('workclass'≠'private'). The protected attribute is chosen to be 'sex', which is a single binary variable. In this example application, about 24% of the total population have high income. Among private workers, the percentage of males with high income is 21.79% higher than for females. The disparity in prevalence is similar among non-private workers at 21.21%. In this example application, t=0.75 is chosen as the threshold for computing the TSP metric since it produces a fraction of positive predictions comparable to the true prevalence of 24%.

In one example embodiment, in Table 5 the AUC, the TSP loss and the MSP loss that were obtained by PCCS, TFCS, and the baselines discussed above are shown for comparison. The pattern in AUC is similar to that in shown Table 2. Unlike Table 2, training on the un-adapted source population appreciably increases both MSP and TSP losses relative to native training, while covariate shift weighting brings these losses back down but not completely. For this dataset, Kamiran-Calders is more successful than PCCS in further reducing score disparity. TFCS with λ=100 again achieves the lowest score parity losses and a correspondingly lower AUC.

In one embodiment, graph 900 plots the dependence of the metrics on the PCCS parameter δ. AUC is remarkably constant over the range of δ values. On this dataset, PCCS smoothly interpolates between the score disparities attained by Kamiran-Calders (low δ) and covariate shift (high δ). It is inferred that the adjustment for covariate shift that is part of PCCS shows no fairness benefit over Kamiran-Calders in this example.

In one embodiment example, Table 5 shows results for the UCI® Adult dataset. In the example application, the source is private sector workers, and the target is non-private sector workers. The protected attribute is gender. In this example application, the Max Δ MSP and Max Δ TSP are respectively equal to MSP loss and TSP loss since there is only one pair of groups. Disparity measures are shown as percentages.

TABLE 5

|  | AUC | MSP Loss | TSP Loss |
|---|---|---|---|
| Native | 0.890 | 19.1 | 8.3 |
| Un-adapted | 0.884 | 22.3 | 12.9 |
| Covariate Shift | 0.884 | 19.7 | 9.9 |
| Kamiran-Calders | 0.878 | 12.7 | 3.6 |
| PCCS (δ = 0.05) | 0.880 | 14.4 | 4.6 |
| TFCS (λ = 100) | 0.825 | 6.6 | 3.3 |

Figure 10:
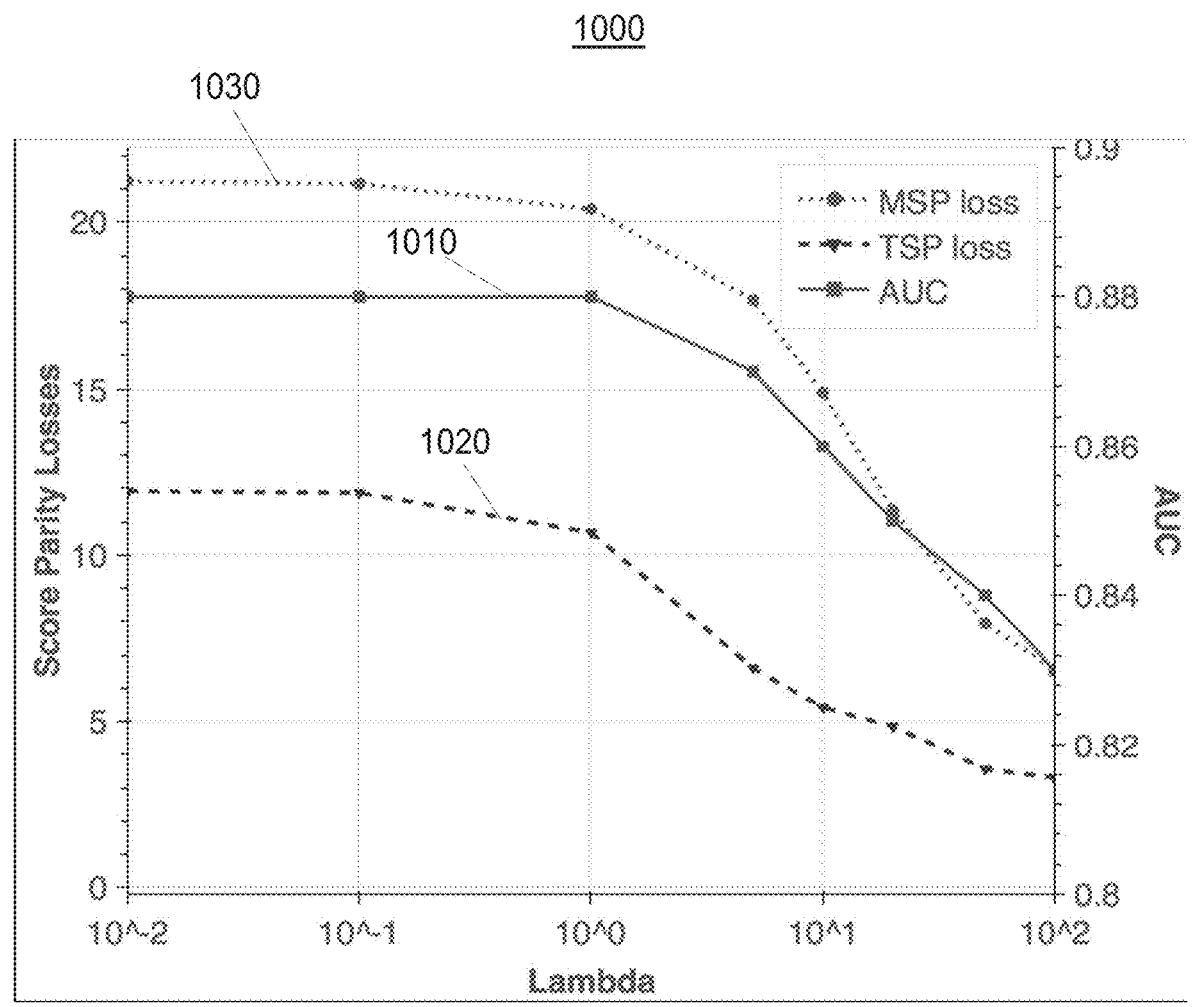
FIG. 10 illustrates a graph for variation of score parities and AUC with the TFCS trade-off parameter A for the UCI® Adult dataset, according to one embodiment.

FIG. 10 illustrates a graph 1000 for variation of score parities and AUC with the TFCS trade-off parameter λ for the UCI® Adult dataset, according to one embodiment. Graph 1000 includes the AUC curve 1010, the TSP loss curve 1020 and the MSP loss curve 1030. Graph 1000 shows the results for system 500 (FIG. 5) transfer learning for fairness in the absence of protected attributes processing, according to one embodiment. Graph 1000 shows plotting of the dependence of the metrics on the TFCS parameter λ, showing behavior similar to graph 700 (FIG. 7). Using the UCI® Adult dataset, it is noted that TFCS must incur an AUC loss of 0.02 to 0.03 to achieve MSP and TSP losses similar to those for Kamiran-Calders shown in Table 5. This loss in AUC may be due to Kamiran-Calders having access to both the labels and the protected attribute in the source domain whereas these are split between source and target for TFCS.

In one embodiment, both PCCS and TFCS together can accommodate the important practical limitation of having protected group information only in the source or target domain. The example applications using PCCS and TFCS show reductions in score disparity compared to baselines with little change in AUC. The MEPS dataset and mobile money credit dataset are new to the algorithmic fairness literature and, are more reflective of real risk assessment applications than some prior benchmarks. Although the example applications are restricted to the case of binary outcomes, the system 500 transfer learning for fairness in the absence of protected attributes processing extends straightforwardly to continuous-valued Y. Specifically, the numerators in (Eq. 6) can be changed to the weighted sums $\tau_{i \in S_k} w_i y_i$, and the loss function $\mathcal{L}$ and predictor s(x) can be chosen appropriately for real-valued Y. One embodiment is aimed at controlling mean score parity (Eq. 3).

Figure 11:
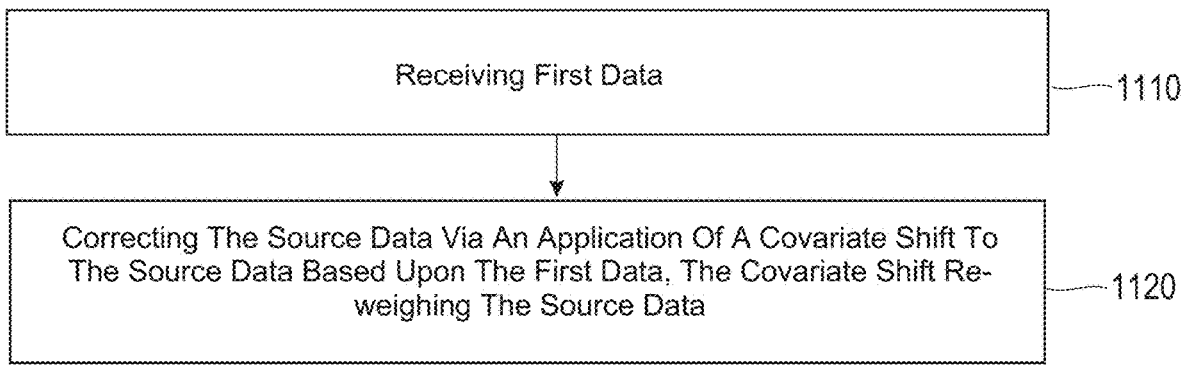
FIG. 11 illustrates a block diagram of a process for transfer learning for fairness in the absence of protected attributes, according to one embodiment.

FIG. 11 illustrates a block diagram of a process 1100 for transfer learning for fairness in the absence of protected attributes, according to one embodiment. In one embodiment, process 1100 utilizes a computing device (from computing node 10, FIG. 1, hardware and software layer 60, FIG. 2, processing system 300, FIG. 3, system 400, FIG. 4, system 500, FIG. 5, etc.) to correct data used in ML. In block 1110, process 1100 receives, by the computing device, first data. In block 1120, process 1100 corrects, by the computing device, the source data via an application of a covariate shift to the source data based upon the first data, where the covariate shift provides re-weighing of the source data.

In one embodiment, the re-weighed source data is used to train one or more ML models in process 1100. In one embodiment, in process 1100 the source data is fully labeled data having one or more protected attributes, the first data is target data, and the covariate shift utilized by the computing device is a PCCS. In one embodiment, process 1100 may provide that PCCS uses learned weights that are chosen as close as possible to covariate shift weights subject to constraints on weighted prevalences.

In one embodiment, process 1100 may provide that the source data is partially labeled data, the first data is target data that includes one or more protected attributes, and the covariate shift utilized by the computing device is a TFCS. In one embodiment, in process 1100 the TFCS uses weights that are chosen to minimize a linear combination of a fairness loss with a classification loss. In one embodiment, in process 1100 the fairness loss is evaluated on the target data where the one or more protected attributes are available.

One or more embodiments may be a system, a method, and/or a computer program product at any possible technical detail level of integration. The computer program product may include a computer readable storage medium (or media) having computer readable program instructions thereon for causing a processor to carry out aspects of the present embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (MID), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely, propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

Aspects of the embodiments are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the embodiments. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present embodiments has been presented for purposes of illustration and description, but is not intended to be exhaustive or limited to the embodiments in the form disclosed. Many modifications and variations will be apparent to those of ordinary skill in the art without departing from the scope and spirit of the embodiments. The embodiment was chosen and described in order to best explain the principles of the embodiments and the practical application, and to enable others of ordinary skill in the art to understand the embodiments for various embodiments with various modifications as are suited to the particular use contemplated.

What is claimed is:

1. A method of utilizing a computing device to correct source data used in machine learning, the method comprising:
   receiving, by a computing device, first data;
   providing, by the computing device, transfer learning processing in absence of one or more protected attributes using a covariate shift combined with re-weighing to reduce a difference in group-specific prevalences for the source data;
   wherein the source data is partially labeled data, the first data is target data that includes the one or more protected attributes, and the transfer learning processing uses a target-fair covariate shift:
   wherein the target-fair covariate shift uses weights that are chosen to minimize a linear combination of a fairness loss with a classification loss; and
   wherein the fairness loss is evaluated on the target data where the one or more protected attributes are available.

2. The method of claim 1, further comprising:
   training, by the computing device one or more machine learning models using the re-weighed source data.

3. The method of claim 1, wherein the source data is fully labeled data having the one or more protected attributes, the first data is target data, and the transfer learning processing uses a prevalence-constrained covariate shift.

4. The method of claim 3, wherein the prevalence-constrained covariate shift uses learned weights based on a difference as compared to covariate shift weights subject to constraints on weighted prevalences.

5. A computer program product for correcting source data used in machine learning, the computer program product comprising a computer readable storage medium having program instructions embodied therewith, the program instructions executable by a processor to cause the processor to:
   receive, by the processor, first data;
   provide, by the processor, transfer learning processing in absence of one or more protected attributes using a covariate shift combined with re-weighing to reduce a difference in group-specific prevalences for the source data;
   wherein the source data is partially labeled data, the first data is target data that includes the one or more protected attributes, and the transfer learning processing uses a target-fair covariate shift;
   wherein the target-fair covariate shift uses weights that are chosen to minimize a linear combination of a fairness loss with a classification loss; and
   wherein the fairness loss is evaluated on the target data where the one or more protected attributes are available.

6. The computer program product of claim 5, wherein the program instructions executable by the processor further causes the processor to:
   train, by the processor, one or more machine learning models using the re-weighed source data.

7. The computer program product of claim 5, wherein the source data is fully labeled data having the one or more protected attributes, the first data is target data, and the transfer learning processing uses a prevalence-constrained covariate shift.

8. The computer program product of claim 7, wherein the prevalence-constrained covariate shift uses learned weights that are chosen based on a difference as compared to covariate shift weights subject to constraints on weighted prevalences.

9. An apparatus comprising:
   a memory configured to store instructions; and
   a processor configured to execute the instructions to:
   receive first data;
   provide transfer learning processing in absence of one or more protected attributes using a covariate shift combined with re-weighing to reduce a difference in group-specific prevalences for a source data;
   wherein the source data is partially labeled data, the first data is target data that includes the one or more protected attributes, and the transfer learning processing uses a target-fair covariate shift; and wherein the target-fair covariate shift uses weights that are chosen to minimize a linear combination of a fairness loss with a classification loss, and the fairness loss is evaluated on the target data where the one or more protected attributes are available.

10. The apparatus of claim 9, wherein the processor is configured to further execute the instructions to:

train one or more machine learning models using the re-weighed source data.

11. The apparatus of claim 9, wherein the source data is fully labeled data having the one or more protected attributes, the first data is target data, and the transfer learning processing uses a prevalence-constrained covariate shift.

12. The apparatus of claim 11, wherein the prevalence-constrained covariate shift uses learned weights that are chosen based on a difference as compared to covariate shift weights subject to constraints on weighted prevalences.

* * * * *